(12) United States Patent
Togo et al.

(10) Patent No.: US 8,695,748 B2
(45) Date of Patent: Apr. 15, 2014

(54) WORK VEHICLE HAVING AN EXHAUST GAS TREATMENT UNIT

(75) Inventors: Manabu Togo, Okayama (JP); Norihide Iwata, Sakai (JP); Keita Ono, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/595,317

(22) Filed: Aug. 27, 2012

(65) Prior Publication Data

US 2013/0213725 A1 Aug. 22, 2013

(30) Foreign Application Priority Data

Nov. 30, 2011 (JP) ................................. 2011-262478

(51) Int. Cl.
*B60K 13/04* (2006.01)
(52) U.S. Cl.
USPC ........................................... 180/309; 60/299
(58) Field of Classification Search
USPC ............ 180/68.1, 309; 60/297; 422/169–171; 248/677
See application file for complete search history.

(56) References Cited

U.S. PATENT DOCUMENTS

2010/0186394 A1* 7/2010 Harrison et al. ................ 60/299
2010/0186395 A1 7/2010 Yang et al.

FOREIGN PATENT DOCUMENTS

| JP | 1191598 A | 4/1999 |
| JP | 200127130 A | 1/2001 |
| JP | 2010185292 A | 8/2010 |
| JP | 2011126488 A | 6/2011 |

* cited by examiner

*Primary Examiner* — John Walters
*Assistant Examiner* — James Triggs
(74) *Attorney, Agent, or Firm* — The Webb Law Firm (57) ABSTRACT

An improvement in a work vehicle having an exhaust gas treatment unit is disclosed. An engine is disposed in an engine room formed in a vehicle body and supported by the vehicle body. A support unit includes right and left vertical struts mounted on the vehicle body across the engine along a vehicle body transverse direction. The exhaust gas treatment unit is disposed inside the engine room and attached to the support unit upwardly of the engine, under a posture elongate along the vehicle body transverse direction.

14 Claims, 7 Drawing Sheets

WORK VEHICLE HAVING AN EXHAUST GAS TREATMENT UNIT

TECHNICAL FIELD OF THE INVENTION

The present invention relates to a work vehicle having an exhaust gas treatment unit mounted inside an engine room.

DESCRIPTION OF THE RELATED ART

There is known a work vehicle having an engine mounted on right and left frames and an exhaust gas treatment unit for treating exhaust gas of the engine. For instance, in a work vehicle disclosed in JP 2001-027130 A, an exhaust gas muffler (an example of an "exhaust gas treatment unit") is disposed upwardly of an engine, wherein the exhaust gas muffler is mounted directly on the engine. With such direct mounting of an exhaust gas muffler on an engine, vibration of the engine is transmitted directly to the exhaust gas muffler, so that the muffler tends to be exposed to significant vibrations.

In the case of a work vehicle disclosed in JP 2011-126488 A, a DPF (diesel particulate filter) is disposed upwardly of an engine and arranged transversely relative to a traveling direction of the vehicle body. The DPF is attached to a thin plate via a mount rubber. Another DPF disclosed in US 2010/0186395 A1 is arranged rearwardly and obliquely upwardly of an engine.

When a relatively large exhaust gas treatment unit such as a DPF is to be mounted inside an engine room, a reasonable layout of the exhaust gas treatment unit is important for appropriate space utilization in the engine room, as well as an appropriate arrangement for supporting the exhaust gas treatment unit arrangement.

SUMMARY OF THE INVENTION

In view of the prior art as described above, a work vehicle according to the present invention comprises:
 a vehicle body;
 an engine room formed in the vehicle body;
 an engine mounted inside the engine room and supported by the vehicle body; and
 a support unit disposed inside the engine room, the support unit having a right vertical strut and a left vertical strut which are mounted erect on the vehicle body across the engine in a vehicle body transverse direction;
 an exhaust gas treatment unit disposed inside the engine room upwardly of the engine, the exhaust gas treatment unit being mounted on the support unit under a posture elongate relative to the vehicle body transverse direction; and
 a cooling air generator for generating cooling air that flows inside the engine room in a vehicle body fore/aft direction.

With the above-described arrangement, vibration transmitted from the engine via the vehicle body is damped by the vertical struts constituting the support unit. As a result, the engine vibration transmitted to the exhaust gas treatment unit is reduced. Further, as the exhaust gas treatment unit and the engine are mounted on the vehicle body independently of each other, the assembly operation too is simplified. Moreover, since the support unit is provided between the vehicle body and the exhaust gas treatment unit, the dead space upwardly of the engine can be effectively availed.

According to one preferred embodiment, the exhaust gas treatment unit is connected to an exhaust gas passage of the engine via a vibration absorbing pipe for absorbing vibration of the engine. With this arrangement, the engine vibration transmitted to the exhaust gas treatment unit can be further reduced.

According to another preferred embodiment, a radiator which is cooled by cooling air flowing form the forward side to the rear side is disposed forwardly of the engine, an air cleaner is disposed rearwardly of the radiator, and the exhaust gas treatment unit is disposed rearwardly of the air cleaner. With this arrangement, since the exhaust gas treatment unit which becomes hot is disposed on the downstream side of the cooling air relative to the air cleaner, it is possible to prevent the hot air present around the exhaust gas treatment unit from being drawn into the air cleaner.

In case the exhaust gas treatment unit is provided as a DPF, an air cleaner for a blower motor becomes necessary. However, by providing a distribution passage branched from an air intake passage for feeding intake air from the air cleaner to the engine, the air cleaner for the engine can be utilized for the blower motor as well.

According to still another preferred embodiment of the present invention, the support unit comprises a portal-shaped frame having a cross beam interconnecting an upper end of the right vertical strut and an upper end of the left vertical strut. With this, the rigidness of the support unit is improved, so that the exhaust gas treatment unit can be supported firmly and reliably.

Further preferably, the exhaust gas treatment unit is attached to the cross beam via a position adjustment mechanism for adjusting the position of the exhaust gas treatment unit. As the position adjustment unit is located upwardly of the engine, a worker can carry out a position adjustment operation without crouching down deeply. Preferably, the position adjustment mechanism is disposed between the cross beam and the exhaust gas treatment unit. With this arrangement, the position of the exhaust gas treatment unit can be readily adjusted simply by moving the exhaust gas treatment unit alone. Further, when the exhaust gas treatment unit is to be attached to the support unit, after position adjustment of the exhaust gas treatment unit on the cross beam, the exhaust gas unit can be attached to the vertical struts, together with the cross beam.

Other features of the work vehicle, advantageous effects derived from the same as well, will be apparent upon reading the following description with reference to the accompanying drawings.

DETAILED DESCRIPTION OF THE PREFERRED EMBODIMENTS

Embodiments of a work vehicle according to the present invention will be described hereinafter with reference to the accompanying drawings. In each embodiment, a tractor will be described as an example of a work vehicle according to the present invention, but the work vehicle is not limited thereto.

First Embodiment

First, a tractor according to a first embodiment of the invention will be described with reference to FIG. 1.

Figure 1:
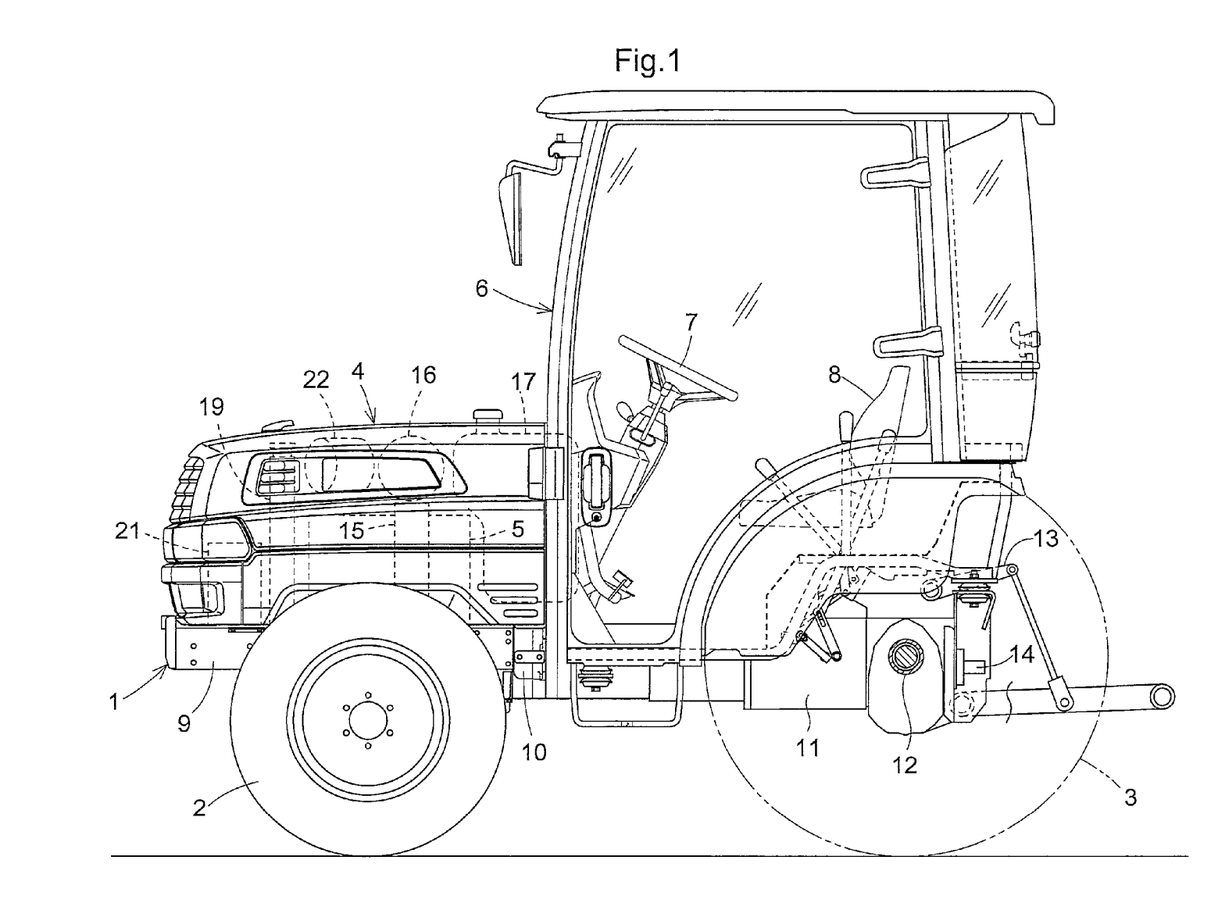
FIG. 1 is a side view showing a tractor according to a first embodiment of the present invention.

As shown in FIG. 1, a tractor includes a traveling vehicle body (referred to briefly as "a vehicle body" hereinafter) 1. The vehicle body 1 includes right and left front wheels 2 and right and left rear wheels 3. At a front portion of the vehicle body 1, an engine hood 4 is provided. An engine 5 is mounted inside an engine room 10 whose top is covered with the engine hood 4. At a rear portion of the vehicle body 1, a cabin 6 is provided and this cabin 6 includes a steering wheel 7 and a driver's seat 8.

From the lower side of the engine 5, right and left front frames 9 extend forwardly, acting as frames constituting the vehicle body 1. An unillustrated front axle case supporting the front wheel 2 is provided at the front frames 9. Further, to the rear side of the engine 5, there are connected a clutch housing 10, a transmission case 11, and a rear axle case 12 supporting the rear wheels 3. At the rear portion of the transmission case 11, there are provided right and left lift arms 13 and a power takeoff (PTO) shaft 14.

Next, the arrangement inside the engine hood 14, that is, the arrangement inside the engine room, will be described with reference to FIG. 2 and FIG. 3.

Figure 2:
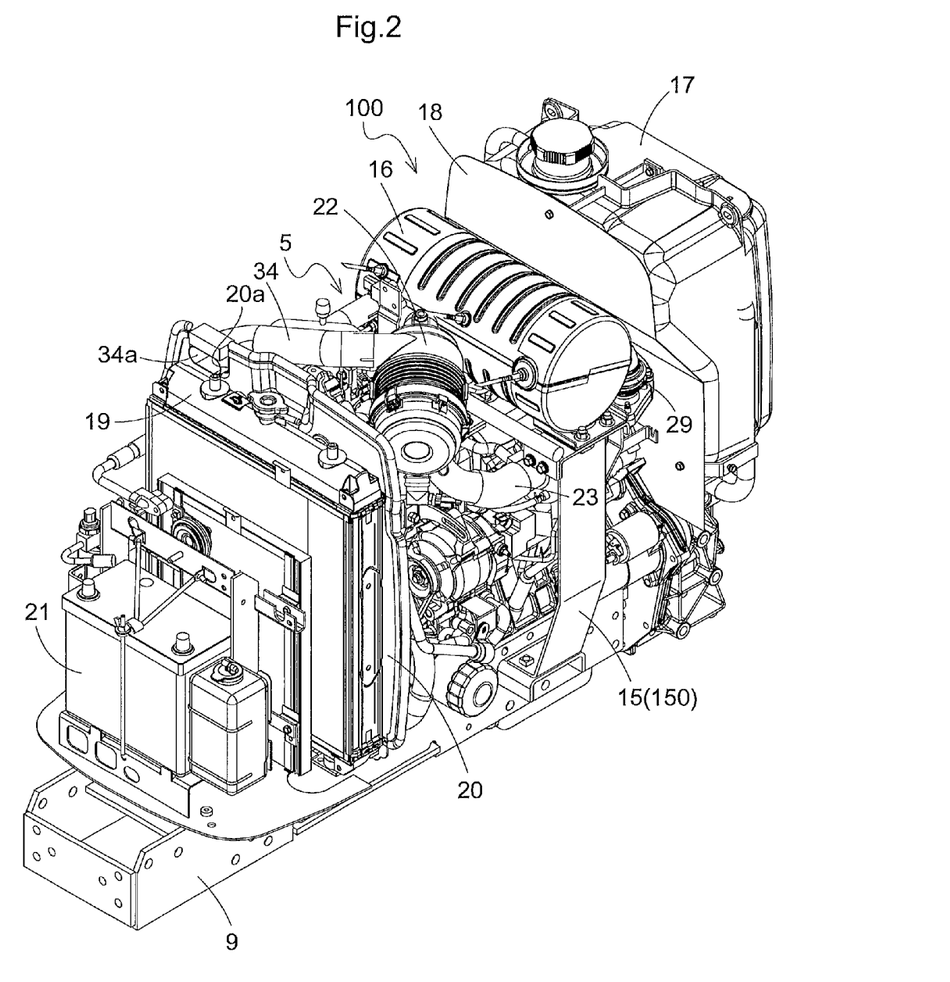
FIG. 2 is a perspective view showing the construction inside an engine hood according to the first embodiment of the present invention.
Figure 3:
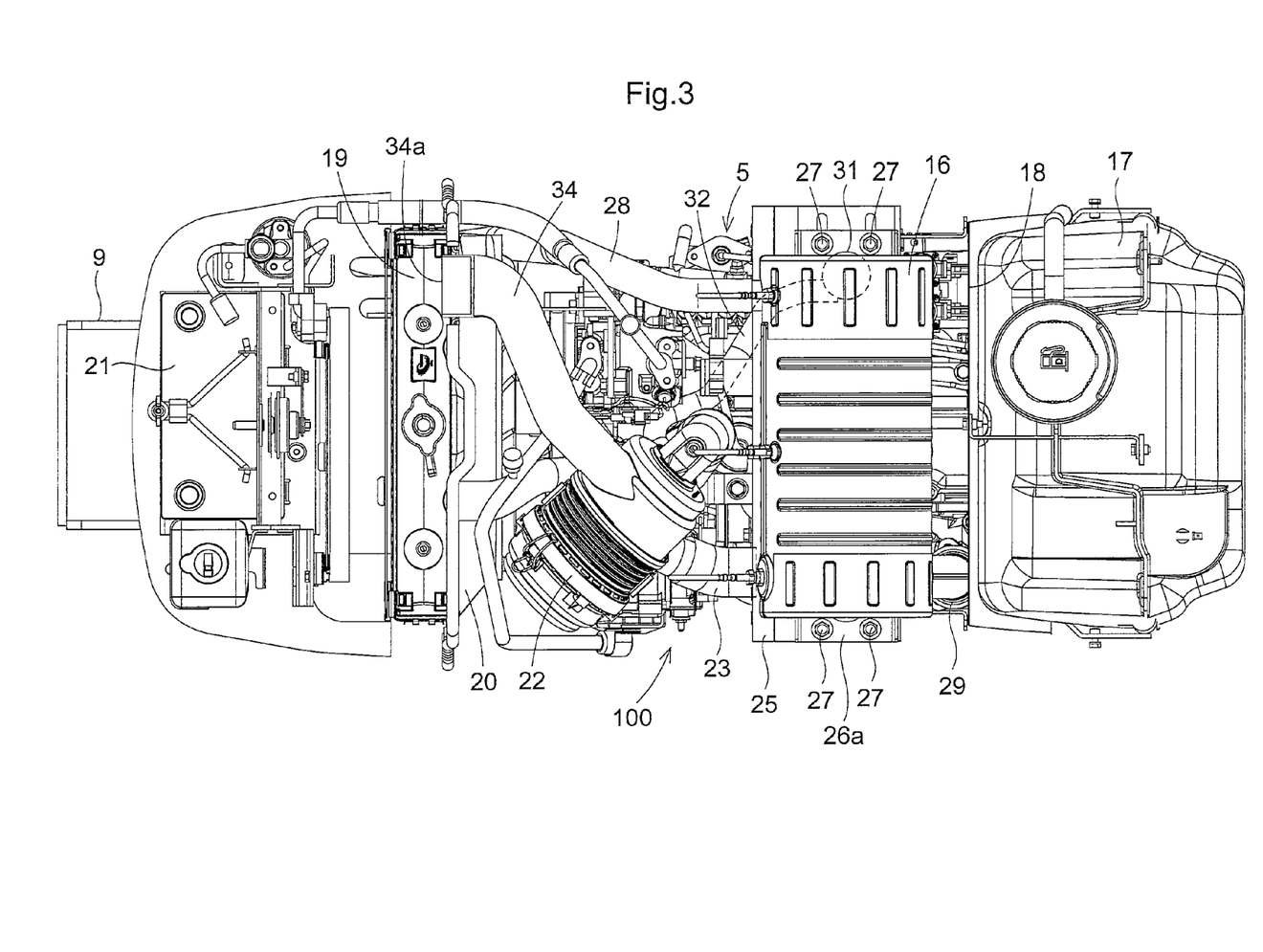
FIG. 3 is a plan view showing the construction inside the engine hood according to the first embodiment of the present invention.

As shown in FIG. 2 and FIG. 3, the engine 5 is mounted on the right and left front frames 9. At the right and left front frames 9, there is provided a support unit 150 for supporting an exhaust gas treatment unit 16. The support unit 150 includes a pair of right and left vertical struts 15 which are mounted erect on the right and left front frames 9, respectively. On these right and left vertical struts 15, the exhaust gas treatment unit 16 is mounted, with this exhaust gas treatment unit 16 being disposed upwardly of the engine 5. That is, the exhaust gas treatment unit 16 is disposed through effective utilization of a vertical space available between the engine hood 4 and the engine 5. The exhaust gas treatment unit 16 is attached to the support unit 150 under a posture longitudinal or elongate along a vehicle body transverse direction. Further, a fuel tank 17 is provided rearwardly of the exhaust gas treatment unit 16. Between this fuel tank 17 and the engine 5 along the fore/aft direction, a partition wall (an example of a second partition plate) 18 is provided.

Further, a radiator 19 is provided forwardly of the engine 5. A battery 21 is provided forwardly of the radiator 19, and an air cleaner 22 is provided rearwardly of the radiator 19. Between the radiator 19 and engine 5 along the fore/aft direction, there is provided a shroud (an example of a first partition plate) 20 for covering an unillustrated cooling fan (an example of a cooling air generator). The exhaust gas treatment unit 16 and the air cleaner 22 are disposed within an intermediate engine room delimited by the shroud 20 and the partition wall 18.

The radiator 19 is cooled by cooling air which flows from the forward side to the rear side under the function of the cooling fan. And, this cooling air is introduced into the engine hood 4 through an unillustrated cooling air inlet formed in the engine hood 4 (e.g. on the front face of the engine hood 4).

The air cleaner 22 is connected via an air intake pipe 23 acting as an "an air intake passage" according to the present invention, to an intake manifold of the engine 5. The air intake upstream side end of the intake pipe 23 is connected to the air cleaner 22, and the air intake downstream side end of the intake pipe 23 is connected to the intake manifold of the engine 5. The intake air from the air cleaner 22 is supplied via the intake pipe 23 to the engine 5 (the intake manifold of the engine 5). Also, the intake downstream side end of the air intake pipe 34 is connected to the air cleaner 22. The intake upstream side end of the intake pipe 34 is engaged within a cutout 20a formed at an upper edge of the shroud 20 upwardly of the radiator 19, so as to introduce cooling air prior to its passage through the radiator 19.

In the above arrangement, the exhaust gas treatment unit 16 is disposed rearwardly of the air cleaner 22. Namely, as the exhaust gas treatment unit 16 which becomes hot is disposed on the downstream side of the cooling air relative to the air cleaner 22, it is made possible to prevent introduction of hot air present around the exhaust gas treatment unit 16 from being drawn into the air cleaner 22.

Next, the support unit 150 including the right and left vertical struts 15, and the exhaust gas treatment unit 16 will be described in greater details with reference to FIGS. 4 through 6.

Figure 4:
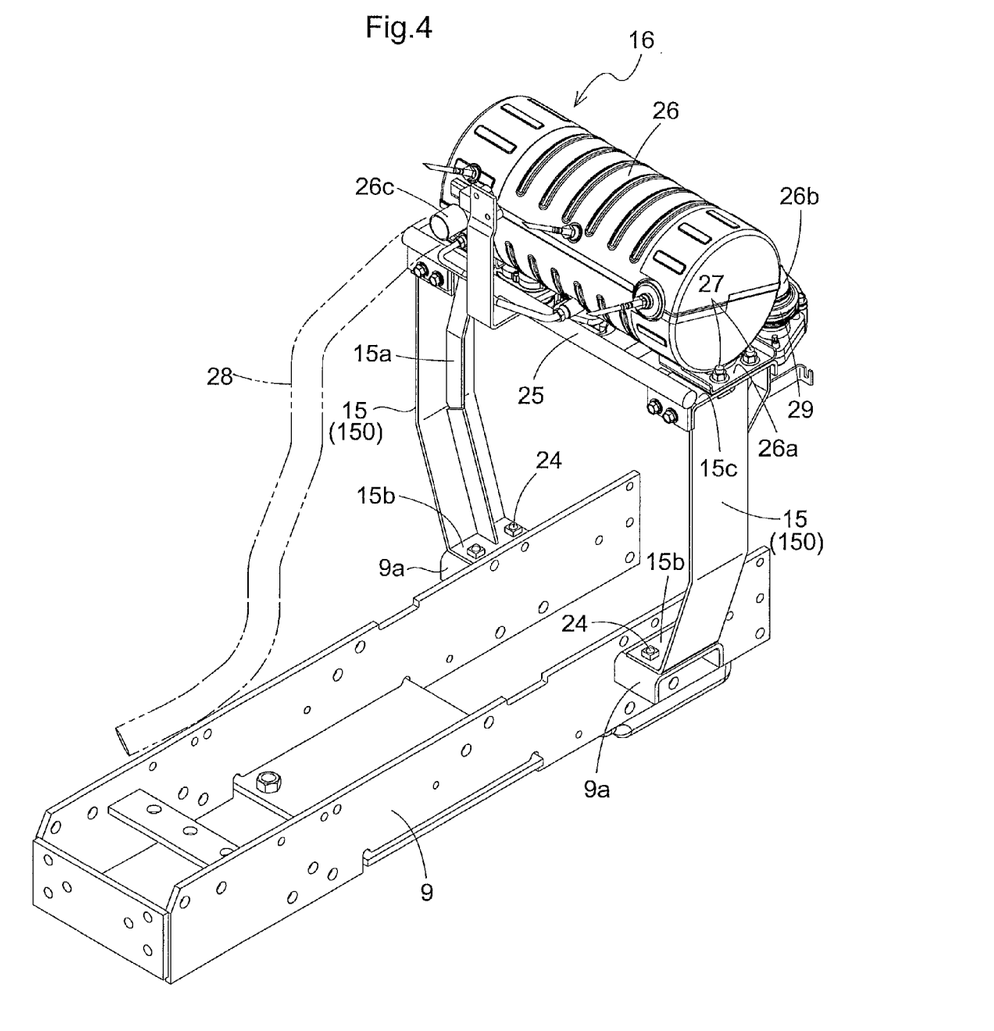
FIG. 4 is a perspective view showing an exhaust gas treatment unit mounted on vertical struts according to the first embodiment of the present invention.
Figure 5:
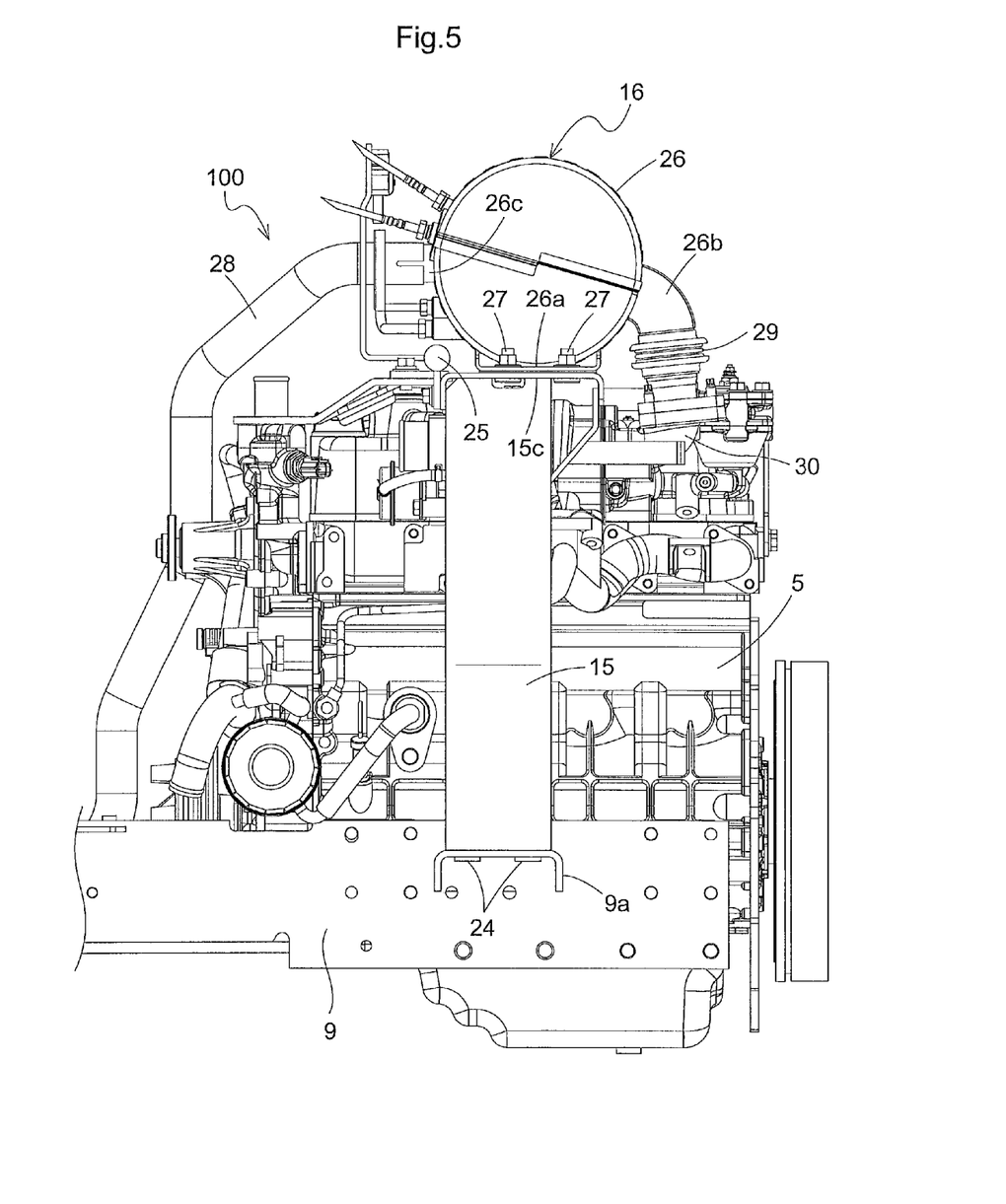
FIG. 5 is a right side view showing the exhaust gas treatment unit mounted on the vertical struts according to the first embodiment of the present invention.
Figure 6:
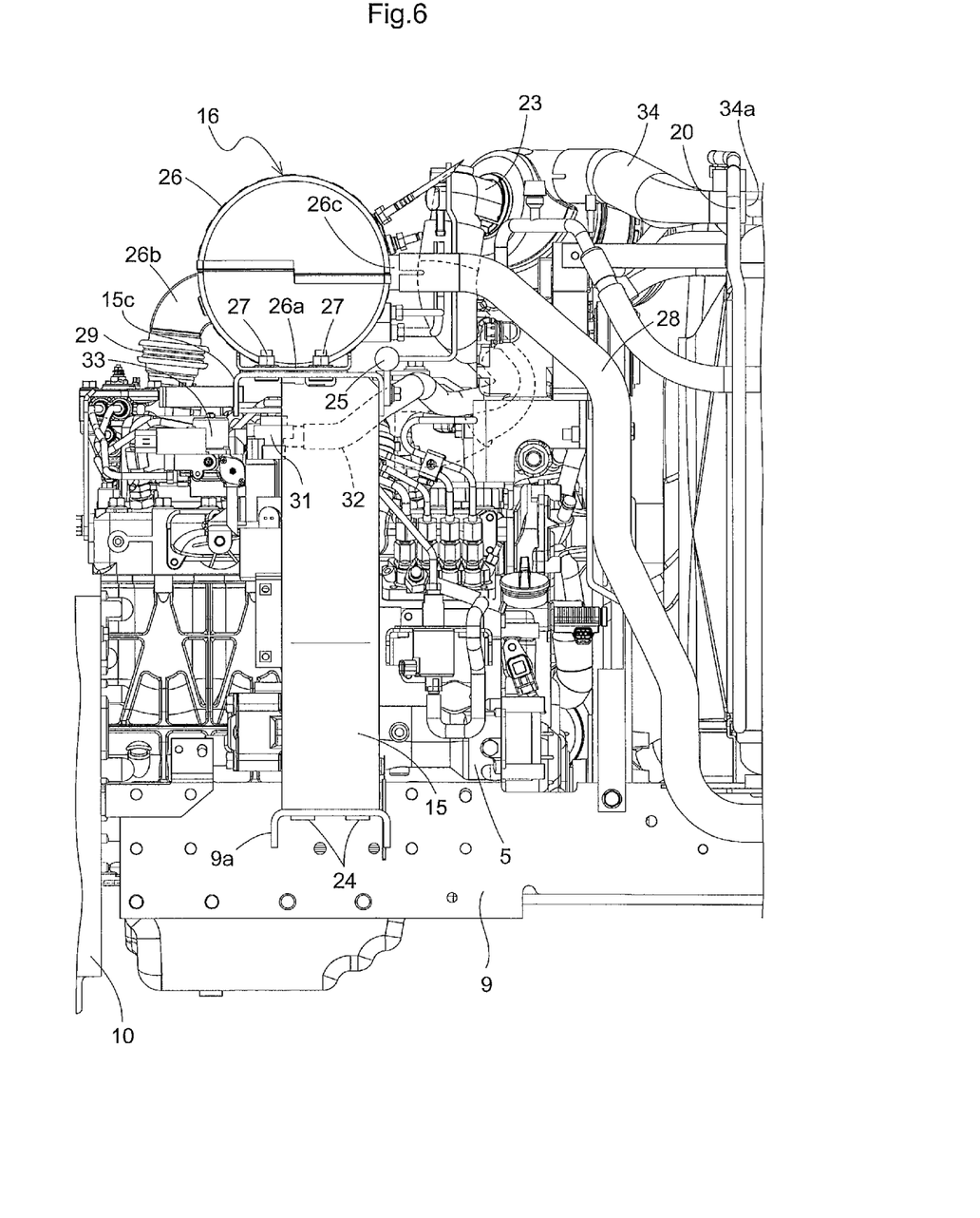
FIG. 6 is a left side view showing the exhaust gas treatment unit mounted on the vertical struts according to the first embodiment of the present invention.

As shown in FIGS. 4 through 6, each of the right and left vertical struts 15 is formed of a plate member which extends along and past the lateral outer side of the engine 5 and upwards. To and along the inner side face of the vertical strut 15, there is attached a reinforcement plate 15a for providing increased rigidity. The lower portion of the vertical strut 15 is bent obliquely toward the lateral inner side, and at the lower end of the vertical strut 15, there is provided a lower attachment portion 15b formed substantially horizontal for attachment of an attachment portion 9a of the front frame 9 associated therewith. The lower attachment portion 15b is formed by bending the lower end of the vertical strut 15 substantially horizontally toward the inner lateral side.

Further, to the outer side faces of the right and left front frames 9, there are provided right and left attachment portions 9a to which the lower attachment portions 15b of the vertical struts 15 are to be attached, respectively. Each attachment portion 9a has an approximately portal shape as seen from the lateral side. The lower attachment portion 15b of the vertical strut 15 and the attachment portion 9a of the front frame 9 are fixed to each other by bolts 24.

On the other hand, at the upper end portion of each vertical strut 15, there is formed substantially horizontal an upper attachment portion 15c to which an attachment portion 26a of the exhaust gas treatment unit 16 (an attachment portion 26a of a substantially cylindrical package 26 to be described later) is to be attached. The upper attachment portion 15c of the right vertical strut 15 and the upper attachment portion 15c of the left vertical strut 15 are connected to each other via a cross beam 25. This cross beam 25 is formed of e.g. a round pipe. The cross beam 25 interconnects the upper attachment portion 15c of the right vertical strut 15 and the upper attachment portion 15c of the left vertical strut 15 on the fore/aft opposed side away from a bellows pipe 29 (the front lower side of the exhaust gas treatment unit 16) which bellows pipe 29 functions as a "vibration absorbing pipe" to be detailed later. That is, the support unit 150 constitutes a portal-shaped frame consisting of the pair of right and left vertical struts 15 and the cross beam 25 interconnecting them.

The exhaust gas treatment unit 16 includes the substantially cylindrical package 26 accommodating a particulate filter (to be referred to briefly as "a DPF" hereinafter). Namely, in the instant embodiment, the exhaust gas treatment unit 16 is provided as a DPF unit. The exhaust gas treatment unit 16 is attached to the upper attachment portions 15c of the right and left vertical struts 15 in such a manner that the unit 16 is disposed with its longitudinal direction aligned along the vehicle body right/left direction (transverse orientation) and upwardly of the engine 5. Further, the exhaust gas treatment unit 16 is disposed along the direction perpendicular to an unillustrated crankshaft provided in the engine 5.

The DPF is a filter substrate for filtering exhaust gas by removing particulate substances composed mainly of ash dust or soot and oxidizing the particulate substances. To the right and left lower faces of the package 26, there are provided substantially horizontal right and left attachment portions 26a. Each attachment portion 26a is secured by bolts 27 to the upper attachment portion 15c of the vertical strut 15 associated therewith. Further, an exhaust gas inlet 26b is provided at a left rear portion of the package 26, and an exhaust gas outlet 26c is provided at a right front portion of the package 26.

To the exhaust gas outlet 26c, there is connected a tail pipe 28. The tail pipe 28 extends from the exhaust gas outlet 26c through the rear side and the lower side of the shroud 20 (see FIG. 2 and FIG. 3). And, the exhaust gas inlet 26b is connected via the bellows pipe 29 to an exhaust manifold 30 (to the exhaust gas inlet of the exhaust manifold 30), the exhaust manifold 30 acting as an "exhaust gas passage" according to the present invention. The bellows pipe 29 has a bellows shape for absorbing vibrations of the engine 5.

Further, a burner 33 is disposed on the exhaust gas upstream side of the exhaust gas treatment unit 16. The burner 33 is provided for heating the exhaust gas from the engine 5 for forcible regeneration of the DPF. The burner 33 receives supply of inlet air by a blower motor 31. To this blower motor 33, there is connected an air intake downstream side end of a distribution pipe 32 which pipe 32 acts as a "distribution passage" according to the present invention. The distribution pipe 32 as branching from the air intake pipe 23, distributes the intake air from the air cleaner 22 to the blower motor 31. The distribution pipe 32 is arranged to extend through the lateral inner side of the left vertical strut 15.

With the above-described arrangement, the intake air from the air cleaner 22 is guided through the distribution pipe 32 to the blower motor 31. The intake air guided to the blower motor 31 is then supplied to the burner 33 by the blower motor 31. With the supply of intake air and ignition of the burner 33, exhaust gas from the engine 5 is heated, so that the temperature of the exhaust gas is increased. As a result, the particulate substances accumulated on the DPF are combusted, whereby the DPF is forcible regenerated.

Second Embodiment

Figure 7:
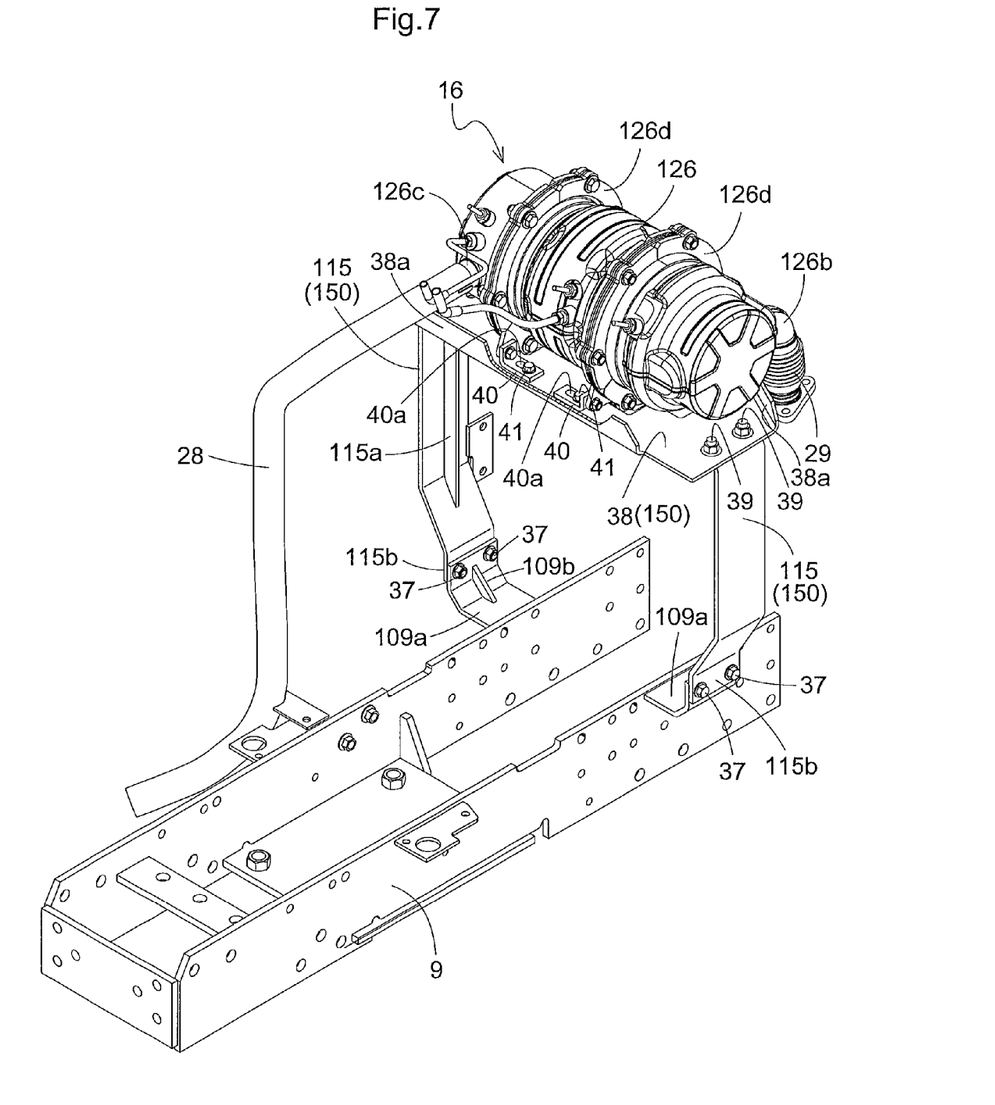
FIG. 7 is a perspective view in partial section showing an exhaust gas treatment unit mounted on vertical struts according to a second embodiment of the present invention.

Next, a tractor according to a second embodiment of the present invention will be described with reference to FIG. 7. Regarding those components denoted with like or identical reference marks/numerals to those in the first embodiment, detailed explanation thereof will be omitted since these are of the identical configurations to the first embodiment.

In the tractor according to the second embodiment, a pair of right and left vertical struts 115 are attached to the right and left front frames 9. The pair of right and left vertical struts 115 extend upward along and through the lateral outer side of the engine 5. A reinforcement plate 115a is attached to the inner side face of each vertical strut 115 for providing increased rigidity. The lower portion of the vertical strut 115 is bent obliquely toward the lateral inner side, and at the lower end of the vertical strut 115, there is formed substantially vertical a lower attachment portion 115b to which an attachment portion 109a of the front frame 9 is to be attached.

Further, to the outer side faces of the right and left front frames 9, there are provided right and left attachment portions 109a to which the lower attachment portions 115b of the vertical struts 115 are to be attached. Each attachment portion 109a has an approximately L-letter shape as seen from the front side. To and along the inner side face of the attachment portion 109a, there is attached a reinforcement plate 109b for providing increased rigidity. The lower attachment portion 115b of the vertical strut 115 and the attachment portion 109a of the front frame 9 are fixed to each other by bolts 37.

The upper end of the right vertical strut 115 and the upper end of the left vertical strut 115 are connected via an attachment plate 38 functioning as a cross beam. The attachment plate 38 is connected to the respective upper ends of the vertical struts 115 by bolts 39. That is, the right and left vertical struts 115 and the attachment plate 38 together constitute a substantially portal-shaped structure as seen in the plan view which strides across the engine 5 in the right/left direction. In this embodiment, the support unit 150 is comprised of the pair of right and left vertical struts 115 and the attachment plate 38. Further, the exhaust gas treatment unit 16 is attached to the attachment plate 38. At the front edge portion and the rear edge portion of the attachment plate 38, there are provided flange portions 38a for increased rigidity of the attachment plate 38.

The exhaust gas treatment unit 16 includes a substantially cylindrical package 126 for accommodating the DPF therein. The package 126 is formed of three longitudinally separate members joined together. An exhaust gas inlet 126b is provided at a left rear portion of the package 126 and an exhaust gas outlet 126c is provided at a right front portion of the package 126. A tail pipe 28 is connected to the exhaust gas outlet 126c. Further, the exhaust gas inlet 126b is connected via the bellows pipe 29 to an exhaust manifold 30 (to the exhaust gas inlet of the exhaust manifold 30). Right and left flange portions 126d are formed at respective joined portions of the package 26. A substantially L-shaped bracket 40 is fixed to each flange portion 126d. In the instant embodiment, forwardly and rearwardly of the right and left flange portions 126d, there are provided four brackets 40. However, the number of brackets 40 is not limited to four.

Each bracket 40 has a slot 40a defined therein to act as a "position adjusting mechanism" for adjusting the position of the exhaust gas treatment unit 16. The slot 40a is formed elongate along the right/left direction (the longitudinal direction of the bracket 40) and a bolt 41 is extended through the slot 40a. Further, the attachment plate 38 has unillustrated bolt holes defined therein for allowing insertion of the bolts 41.

With the above-described construction, as the bolts 41 are inserted into the slots 40a of the brackets 40 and the bolt holes of the attachment plate 38 and fastened therein, the exhaust gas treatment unit 16 is secured to the attachment plate 38. When the bolts 41 are loosened, the exhaust gas treatment unit 16 is rendered movable in the right/left direction within the extensions of the slots 40a, so that fine adjustment of the right/left position of the exhaust gas treatment unit 16 is made possible. Also, prior to the attachment of the unit 16 to the struts 115, the exhaust gas treatment unit 16 can be attached to the vertical struts 115 after the position adjustment of the exhaust gas treatment unit 16 on the attachment plate 38. Thus, there is no need for position adjustment of the exhaust gas treatment unit 16 after the attachment thereof to the vertical struts 115.

Other Embodiments

The present invention may be alternatively embodied as follow:—

(1) In the foregoing description, the front frame 9 extends forwardly from the lower side portion of the engine 5. The invention is not limited thereto. For instance, the front frame 9 can extend along the entire length (fore/aft length) of the vehicle body 1.

(2) In the foregoing description, the exhaust gas treatment unit 16 contains a DPF. The invention is not limited thereto. For instance, the exhaust gas treatment unit 16 can be a muffler or a unit containing a DOC (diesel oxidation catalyst).

(3) In the foregoing description, the slot 40a is formed in the bracket 40. The invention is not limited thereto. For instance, a slot acting as a position adjustment mechanism according to the present invention may be formed in the attachment plate 38.

(4) In the foregoing description, the slot 40a is formed elongate in the right/left direction. The invention is not limited thereto. For instance, the slot 40a may be formed elongate in the fore/aft direction. With this, fore/aft position adjustment of the exhaust gas treatment unit 16 is made possible. Further, fine adjustment of the vertical position of the exhaust gas treatment unit 16 may be rendered possible by means of an unillustrated shim.

(5) In the foregoing description, the slot 40a is provided for adjustment of the position of the exhaust gas treatment unit 16 relative to the attachment plate 38. The invention is not limited thereto. For instance, the position adjustment mechanism according to the present invention may be configured to allow position adjustment of the exhaust gas treatment unit 16 relative to the front frame 9. In this case, a slot acting as the position adjustment mechanism according to the present invention will be formed in the lower attachment portion 15b (115b) of the vertical strut 15 (115) or in the attachment portion 9a (109a) of the front frame 9. Further alternatively, the position adjustment mechanism according to the present invention may be configured to allow position adjustment of the exhaust gas treatment unit 16 relative to the upper attachment portion 15c of the vertical strut 15. In this case, the slot according to the present invention will be formed in the attachment portion 26a.

What is claimed is:

1. A work vehicle comprising:
    a vehicle body, the vehicle body having a vehicle body frame;
    an engine room formed in the vehicle body;
    an engine mounted inside the engine room and mounted on the vehicle body frame of the vehicle body;
    a support unit disposed inside the engine room, the support unit having a right vertical strut and a left vertical strut which are mounted erect from the vehicle body frame across the engine in a vehicle body transverse direction, each of the right vertical strut and the left vertical strut extending to a level higher than the engine;
    an exhaust gas treatment unit disposed inside the engine room upwardly of the engine, the exhaust gas treatment unit being mounted on the support unit under a posture elongate relative to the vehicle body transverse direction; and
    a cooling air generator for generating cooling air that flows inside the engine room in a vehicle body fore/aft direction.

2. The work vehicle according to claim 1, wherein the exhaust gas treatment unit is disposed such that the flow of exhaust gas flowing inside the exhaust gas treatment unit agrees to the vehicle body transverse direction.

3. The work vehicle according to claim 1, further comprising:
    a radiator cooled by the cooling air generated by the cooling air generator; and
    an air cleaner disposed rearwardly of the radiator,
    wherein the exhaust gas treatment unit is disposed rearwardly of the air cleaner.

4. The work vehicle according to claim 3, wherein the exhaust gas treatment unit and the air cleaner are disposed at substantially the same height.

5. The work vehicle according to claim 4, further comprising:
    an engine hood which covers the engine room from above,
    wherein the height of a top of the exhaust gas treatment gas is substantially the same as the height of a top of the air cleaner, and the engine hood extends substantially horizontally relative to the vehicle body fore/aft direction.

6. The work vehicle according to claim 5, wherein the engine room is divided along the vehicle fore/aft direction by a first partition plate and a second partition plate, the exhaust gas treatment unit and the air cleaner being disposed within an intermediate engine room delimited by the first partition plate and the second partition plate.

7. The work vehicle according to claim 1, wherein the support unit comprises a portal-shaped frame having a cross beam interconnecting an upper end of the right vertical strut and an upper end of the left vertical strut.

8. The work vehicle according to claim 7, wherein the support unit is formed of a plate member, the support unit being attached to the vehicle body such that a plate thickness direction thereof is aligned with the vehicle body transverse direction.

9. The work vehicle according to claim 8, further comprising:
    a vibration absorbing pipe for absorbing vibration of the engine,
    wherein the exhaust gas treatment unit is connected to an exhaust gas passage of the engine via the vibration absorbing pipe.

10. The work vehicle according to claim 1, wherein:
    the exhaust gas treatment unit comprises a particulate filter; and
    the work vehicle further comprises:
        a burner for heating exhaust gas from the engine and feeding the heated gas to the particulate filter for forcible regeneration thereof; and
        a blower motor for supplying, to the burner, a portion of intake air to be supplied to the engine.

11. The work vehicle according to claim 1, further comprising:
    a position adjustment mechanism for adjusting the position of the exhaust gas treatment unit.

12. The work vehicle according to claim 11, wherein the position adjustment mechanism is provided between the support unit and a bracket for fixing the exhaust gas treatment unit to the support unit.

13. A work vehicle comprising:
    a vehicle body;
    an engine room formed in the vehicle body;

an engine mounted inside the engine room and supported by the vehicle body;

a support unit disposed inside the engine room, the support unit having a right vertical strut and a left vertical strut which are mounted erect on the vehicle body across the engine in a vehicle body transverse direction;

an exhaust gas treatment unit disposed inside the engine room upwardly of the engine, the exhaust gas treatment unit being mounted on the support unit under a posture elongate relative to the vehicle body transverse direction;

a cooling air generator for generating cooling air that flows inside the engine room in a vehicle body fore/aft direction;

a radiator cooled by the cooling air generated by the cooling air generator;

an air cleaner disposed rearwardly of the radiator; and an engine hood which covers the engine room from above;

wherein the exhaust gas treatment unit is disposed rearwardly of the air cleaner;

wherein the exhaust gas treatment unit and the air cleaner are disposed at substantially the same height; and wherein the height of a top of the exhaust gas treatment gas is substantially the same as the height of a top of the air cleaner, and the engine hood extends substantially horizontally relative to the vehicle body fore/aft direction.

14. A work vehicle comprising:

a vehicle body;

an engine room formed in the vehicle body;

an engine mounted inside the engine room and supported by the vehicle body;

a support unit disposed inside the engine room, the support unit having a right vertical strut and a left vertical strut which are mounted erect on the vehicle body across the engine in a vehicle body transverse direction;

an exhaust gas treatment unit disposed inside the engine room upwardly of the engine, the exhaust gas treatment unit being mounted on the support unit under a posture elongate relative to the vehicle body transverse direction;

a cooling air generator for generating cooling air that flows inside the engine room in a vehicle body fore/aft direction; and a vibration absorbing pipe for absorbing vibration of the engine;

wherein the support unit comprises a portal-shaped frame having a cross beam interconnecting an upper end of the right vertical strut and an upper end of the left vertical strut;

wherein the support unit is formed of a plate member, the support unit being attached to the vehicle body such that a plate thickness direction thereof is aligned with the vehicle body transverse direction; and wherein the exhaust gas treatment unit is connected to an exhaust gas passage of the engine via the vibration absorbing pipe.

* * * * *